United States Patent [19]

Huver et al.

[11] Patent Number: 5,561,198

[45] Date of Patent: Oct. 1, 1996

[54] ACTIVATOR FOR CYANOACRYLATE ADHESIVES

[75] Inventors: Thomas Huver, Duesseldorf; Christian Nicolaisen, Ronnenberg; Susanne Camp, Hanover, all of Germany

[73] Assignee: Henkel Kommanditgesellschaft auf Aktien, Duesseldorf, Germany

[21] Appl. No.: 473,591

[22] Filed: Jun. 7, 1995

Related U.S. Application Data

[62] Division of Ser. No. 133,152, Oct. 12, 1993, Pat. No. 5,428,115.

[30] Foreign Application Priority Data

Apr. 16, 1991 [DE] Germany ............... 41 12 315.8
Apr. 7, 1992 [WO] WIPO ............... PCT/EP92/00786

[51] Int. Cl.$^6$ ............................................. C08F 8/32
[52] U.S. Cl. ................ 525/379; 525/328.2; 526/201; 526/218; 526/297
[58] Field of Search .................. 525/379; 526/201, 526/217

[56] References Cited

U.S. PATENT DOCUMENTS 3,254,111  5/1966  Hawkins et al. ................. 260/465.4
3,654,340  4/1972  Banitt ................. 260/465.4
4,120,762  10/1978  Adler et al. .
5,268,436  12/1993  Huver et al. ............ 526/216

FOREIGN PATENT DOCUMENTS 2413406  10/1975  Germany .

OTHER PUBLICATIONS

Polym. Prepr., Am. Chem. Soc., Div. Polym. Chem., 19 (2) pp. 585–590.

Ullmann's Encyclopedia of Industrial Chemistry, vol. A1, p. 240, Verlag Chemie Weinheim, (1985).

Encyclopedia of Polymer Science and Technology, Index vol., p. 447 (John Wiley & Sons, Inc.., NY, NY 1990) and vol. 1, p. 570 (1985).

*Primary Examiner*—Bernard Lipman
*Attorney, Agent, or Firm*—Ernest G. Szoke; Wayne C. Jaeschke; John Daniel Wood

[57] ABSTRACT

An activator for cyanoacrylate adhesives based on N,N-dialkyl aniline derivatives is provided. The activators are characterized by a molecular weight of more than 200 and by at most 3 carbon atoms for both N,N-dialkyl substituents together. Also provided are methods of production and use of the activator and to the combination product of the activator and the cyanoacrylate adhesive.

9 Claims, No Drawings

ACTIVATOR FOR CYANOACRYLATE ADHESIVES

This application is a divisional application of U.S. Ser. No. 08/133,152 filed 12 Oct. 1993 now U.S. Pat. No. 5,428,115.

BACKGROUND OF THE INVENTION

1. Field of the Invention

This invention relates to an activator for cyanoacrylate adhesives based on N,N-dialkyl aniline derivatives, to its production and use and to the combination product of the activator and the cyanoacrylate adhesive.

An "activator" is generally understood to be an accelerator used separately to cure a chemically reacting one-component adhesive. In the present case, the polymerization of 2-cyanoacrylates in particular is activated.

2. Discussion of Related Art

Activators as defined above are known. Thus, DE-OS 24 13 406 describes particles of a porous support impregnated with an N,N-dialkyl-substituted aniline containing 1 to 4 carbon atoms in the alkyl radical for initiating the delayed polymerization of monomeric cyanoacrylates. The delay is brought about by the porous supports. The N,N-dialkyl-substituted anilines used include N,N-dimethyl aniline, N,N, 2,4-tetramethyl aniline, N,N,3,5-tetramethyl aniline, N,N-dimethyl-o-toluidine, N,N-dimethyl-m-toluidine, N,N-dimethyl-p-toluidine, N-methyl-N-phenylbenzyl amine and/or their corresponding N-ethyl and N,N-diethyl derivatives.

N,N-Dimethyl-p-toluidine is preferred. The adhesive bonds obtained are not transparent. The invention is intended for the field of dental medicine. The disadvantage that N,N-dimethyl toluidine is toxic and has an unpleasant odor is particularly serious in this case.

Accordingly, there has been no shortage of attempts to use less toxic activators. In Polym. Prepr., Am. Chem. Soc., Div. Polym. Chem., 19(2), pages 585–90, aniline derivatives were investigated both from this viewpoint and for cure time, strength and color stability. Besides N,N-dimethyl toluidine and xylidine, 4-N,N-dimethylaminobenzaldehyde and benzoic acid and methyl esters thereof were among the aniline derivatives investigated. Although these compounds may be less toxic, they are still unsuitable for use as activators because they activate far too weakly, if at all. Other activators rapidly form a skin with subsequent slow curing when solutions thereof are sprayed onto a monomeric cyanoacrylate layer. The shock-like curing at the surface results in a wrinkled structure which, in addition, destroys transparency in most cases.

Accordingly, N,N-dimethyl toluidine remains the only effective activator for cyanoacrylates. Since it is classified as a "T substance" under the legislation on chemicals, this activator has to be used in a concentration of more than 1%. Further disadvantages of the known activator are its volatility, which releases DMT even after bonding, and the unpleasant odor associated therewith.

Accordingly, the problem addressed by the present invention was to remedy this situation by providing an activator which would have few, if any, of these disadvantages and which would be better in its handling and performance properties than known activators, particularly in regard to the balance between transparency, odor, toxicity, curing behavior, strength and surface structure.

DESCRIPTION OF THE INVENTION

The solution provided by the invention is defined in the claims. It lies in the choice of certain tertiary aniline derivatives of which the molecular weight plays a crucial part. It should be above 200 and is preferably above 600. In the context of the invention, the molecular weight is an average value derived from the stoichiometry of the reaction mixtures.

"Based on" means that the activator is largely built up on the effect of the aniline derivatives according to the invention. In addition, it may also contain inert liquids or solids.

The dialkyl aniline derivatives according to the invention are used mainly in the form of a solution in organic solvents. However, not only should the solvent dissolve the dialkyl aniline derivatives according to the invention, it should also be soluble in the monomeric cyanoacrylate. In addition, it should be inert to the dialkyl aniline derivatives according to the invention and should readily evaporate at room temperature. Suitable solvents are ketones, such as acetone and methyl ethyl ketone; esters, such as ethyl, propyl or butyl acetate; chlorinated hydrocarbons, such as methylene chloride or 1,1,1-trichloroethane; aromatic hydrocarbons, such as toluene; and aliphatic hydrocarbons, such as n-heptane. The dialkyl aniline derivatives according to the invention are best dissolved in a concentration of 0.1 to 5% by weight and preferably in a concentration of 0.5 to 2% by weight.

In addition, the solution may contain other substances, for example dyes or optical brighteners, to enable its application to be better controlled.

The solutions containing the aniline derivatives according to the invention may be applied to the surfaces to be treated in finely dispersed form by immersion, spraying, spreading or any other suitable method. They may be applied to the parts to be joined both before and after the cyanoacrylate adhesive. An activator is preferably applied before or afterwards.

In one advantageous embodiment, however, the activator according to the invention may also be mixed with powder to form a paste which, after mixing with cyanoacrylate adhesive, may be used to seal gaps or to fill cavities.

In the dialkyl aniline derivatives according to the invention, the dialkyl aniline group preferably forms a terminal group of oligomers or polymers. The oligomers consist of only a few basic units, namely 2 to 10.

Dialkyl aniline derivatives corresponding to general formula I:

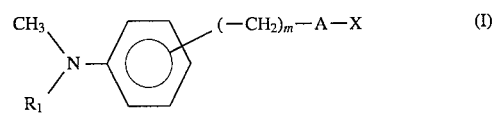

in which

R$_1$ is a CH$_3$ or C$_2$H$_5$ radical, m is a number 0, 1 or 2,

A represents O, NH or

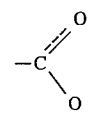

X is a polymer of ethylene or propylene oxide.

N,N-dimethyl derivatives and derivatives with substituents in the m- or p-position are advantageous.

The dialkyl aniline derivatives of formula I according to the invention may be prepared from N,N-dialkyl aniline compounds containing reactive groups, such as OH, NH$_2$, CH$_2$OH,

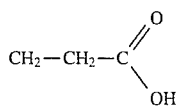

or CH$_2$NH$_2$, and suitable polymerizable low molecular weight compounds, such as ethylene or propylene oxide. Their molecular weight is preferably of the order of 700.

Particularly preferred aniline derivatives correspond to general formula II:

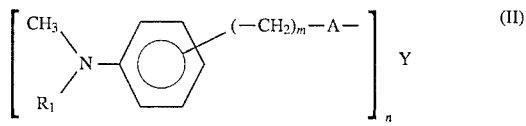

in which

R$_1$, m and A have the same meaning as in formula I, n is a number of 1 to 6 and Y is a group obtainable by reaction of n-functional isocyanate, epoxide, carboxylic acid, carboxylic acid ester or carboxylic anhydride compounds with the substituents —AH of the N,N-dialkyl aniline group. Accordingly, these activators according to the invention are reaction products of reactive oligomers or prepolymers with corresponding functional tertiary amines. Examples of the functionality of the oligomers or polymers are isocyanate, epoxy, carboxyl, ester or carboxylic anhydride groups. p-Dimethylaminobenzyl alcohol, 3-dimethylaminophenol, N,N-dimethylamino-p-phenylene diamine and N,N-dimethylamino-m-phenylene diamine may be used as reactive N,N-dialkyl aniline compounds.

In the production of the (poly)urethane-based activators, it is of advantage initially to react polyols, such as polyethylene glycol, polypropylene glycol, trimethylol propane, polycaprolactone and polyoxytetramethylene, with diisocyanates and subsequently to react the product of this reaction with the N,N-dialkyl aniline derivatives bearing reactive substituents, such as —OH, —NH$_2$, —CH$_2$OH, —CH$_2$NH$_2$ and —COOH.

The present invention also relates to a combination product for bonding parts to be joined which contains a cyanoacrylate adhesive in addition to the N,N-dialkyl derivatives according to the invention. The cyanoacrylate adhesive consists essentially of monomeric cyanoacrylates corresponding to the general formula H$_2$C=C(CN)—COOR, where R is an alkyl, alkenyl, cycloalkyl, aryl, alkoxyalkyl, aralkyl or haloalkyl group, more particularly a methyl, ethyl, n-propyl, isopropyl, n-butyl, isobutyl, pentyl, hexyl, allyl, methallyl, crotyl, propargyl, cyclohexyl, benzyl, phenyl, cresyl, 2-chloroethyl, 3-chloropropyl, 2-chlorobutyl, trifluoroethyl, 2-methoxyethyl, 3-methoxybutyl and 2-ethoxyethyl group. The cyanoacrylates mentioned above are known to the expert on adhesives, see Ullmann's Encyclopedia of Industrial Chemistry, Vol. A1, page 240, Verlag Chemie Weinheim (1985), and U.S. Pat. Nos. 3,254,111 and 3,654,340.

The activators according to the invention have above all the following positive effects:

They can also act as a primer, i.e. increase bond strength after priming.

They enable the cure time to be adjusted under control which provides for safe working.

They lead to transparent colorless bonds, i.e. the use of the activators according to the invention produces hardly any visible changes, such as wrinkling or white discoloration.

They have a good technical property profile comparable with that of the known N,N-dimethyl toluidine.

The reduction in strength is negligible.

There is no evidence of any odor.

Toxicity is reduced.

EXAMPLES

The invention is illustrated by the following Examples.

I Starting Products

The activators according to the invention were prepared from the following aniline compounds and reactive oligomers or prepolymers: p-Dimethylaminobenzyl alcohol I, 3-dimethylaminophenol II and N,N-dimethylamino-p-phenylenediamine III.

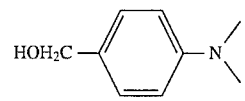

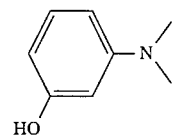

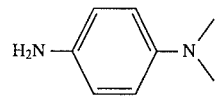

The oligomers or prepolymers are:

1. T1890/100 (trimerized isophorone diisocyanate, a product of Hüls),
2. DESMODUR N (trimerized hexamethylene diisocyanate, a product of Bayer AG),
3. Reaction product of TDI (2,4-toluene diisocyaante) and CP 455 (macrotriol based on polypropylene glycol with a molecular weight of approx. 430) so that a product of the CP 455×3 TDI type if formed.
4. Reaction product of TDI (2,4-toluene diisocyanate) and TMP (trimethylol propane) so that a product of the TMP×3 TDI type is formed.
5. Reaction product of TDI (2,4-toluene diisocyanate) and PPG 425 (difunctional polypropylene glycol) so that a product of the PPG 425×2 TDI type is formed.

To prepare the NCO-terminated PUR's 3), 4) and 5), an approximately 20% solution of the polyol and the TDI in ethyl acetate was heated to 80° C. to reach the theoretical NCO content.

II Production of the Activators According to the Invention

A) Activator of the T 1890/100×3 II type 10.3 g 3-N,N-dimethylaminophenol (II) dissolved in 20.6 g ethyl acetate were added to a solution of 18.3 g T 1890/100 (trimerized isophorone diisocyanate, a product of Hüls) in 18.3 g ethyl acetate and the mixture obtained was heated for 1 hour to the reflux temperature. After addition of 15 mg STANCLERE TL (dibutyl tin dilaurate), the mixture was kept at the boiling temperature until the NCO content fell below 0.2%. The solution obtained was then diluted to the desired in-use concentration. The molecular was approx. 1,100.

B) Activator of the T 1890/100×3 III type

As in A), except that N,N-dimethylamino-p-phenylene diamine (III) was used instead of 3-N,N-dimethylaminophenol (II). The molecular weight was approx. 1,100.

C) Activator of the T 1890/100×3 I type

As in A), except that p-N,N-dimethylaminobenzyl alcohol (I) was used instead of 3-N,N-dimethylaminophenol (II). The molecular weight was approx. 1,100.

D) Activator of the DESMODUR N×3×II type

As in A), except that DESMODUR (2) was used instead of T 1890/100 (1). The molecular weight was approx. 1,000.

E) Activator of the CP 455×3 TDI×3 I type

4-N,N-dimethylaminobenzyl alcohol (I) in the form of an approx. 20% solution in ethyl acetate was added at 60° C. to an approximately 20% solution of the reaction product of TDI and CP 455 (3) and the resulting solution was heated at the reflux temperature until the NCO content was below 0.05%. The solution thus obtained was diluted to the desired in-use concentration. The molecular weight was approx. 1,400.

F) Activator of the TMP×3 TDI×3 I type

As in E), except that TMP was used instead of CP 455. The molecular weight was approx. 1,100.

G) Activator of the PPG 425×2 TDI×2 I type

As in E), except that the trifunctional prepolymer based on PPG was replaced by a difunctional prepolymer. The molecular weight was approx. 1,100.

III The Activators were Tested According to the Following Criteria a) reactivity,
b) cure rate on activated aluminium test strips,
c) cure rate after activation,
d) tensile shear strength on sand-blasted aluminium strips,
e) transparency and
f) odor of the activator.

a) Determination of reactivity

Degreased aluminium strips are immersed in an activator solution and, after airing of the solvent (2 minutes), were bonded to a non-activated test strip. The cyanoacrylate was applied to the untreated test strips. To determine reactivity, the test strips bonded with a 1.5 cm overlap are fixed for a certain time and loaded with a 500 g weight. The reactivity is expressed as the time after which the bond can be loaded with the weight for 5 seconds.

b) Cure rate on activated test strips

Degreased aluminium test strips are sprayed with the activator solutions from a distance of approx. 15 cm. After airing (approx. 2 minutes), a drop and a bead are applied to the treated test specimens and the time after which the cyanoacrylate has completely polymerized is determined.

c) Cure rate on subsequently activated surfaces

A drop and a bead of cyanoacrylate adhesive are also applied to degreased aluminium test stips. Premature polymerization is obtained by subsequent spraying with a 2% activator solution. In practice, this is a method of curing excess adhesive.

d) Testing of tensile shear strength on sand-blasted aluminium strips

For this measurement, degreased sandblasted test strips are bonded with a 1 cm overlap. The test specimens are pretreated by immersion in the activator solution. After evaporation of the solvent, the cyanoacrylate adhesive is applied to an untreated test strip because polymerization would take place immediately if it were applied to activated test strip, preventing accurate adjustment. The measurements were carried out after storage for 5 days at room temperature.

IV Test Results

With the cyanoacrylate adhesive SICOMET 8300 of Sichel-Werke GmbH (Based on ethyl cyanoacrylate), the activators according to the invention produced the following results which were compared with those of N,N-dimethyl toluidine (DMT):

The activators according to the invention have a far less unpleasant odor than DMT.

The appearance of the adhesive cured with the activators according to the invention corresponds to that of the adhesive activated with dimethyl toluidine, particularly in regard to transparency.

Strength was slightly reduced, but remained at an acceptable level.

The activators according to the invention basically cure the adhesive more slowly than dimethyl toluidine for the same concentration by weight.

Cure times on activated strips of basically less than 60 seconds are observed in the case of a bead. This accords with the known activator DMT. In the case of a drop, the cure time rises to 120 seconds and longer whereas, with DMT, it increases to approx. 80 seconds. Similar results are obtained where curing is followed by spray activation.

Some of the results obtained with a 1% by weight solution in ethyl acetate are set out in the following Table:

| Activator | Strength [n/mm$^2$] | Reactivity [s] |
| --- | --- | --- |
| DMT | 14.1 | 20 |
| E | 10.4 | 35 |
| F | 7.0 | 30 |
| C | 14.8 | 30 |
| B | 11.5 | 15 |
| A | 13.4 | 15 |
| D | 13.2 | 30 |

The activators according to the invention provide for controlled curing behavior: reactivity and cure time in seconds in the event of subsequent spray activation with a solution of activator A.

| | Cure time (secs.) | | |
| --- | --- | --- | --- |
| % by weight | Drop | Bead | Reactivity [s] |
| 0.2 | >300 | >300 | 45 |
| 0.5 | >300 | 300 | 15 |
| 1.0 | 120 | 40 | 15 |
| 2.0 | 90 | 20 | <15 |

We claim:

1. A composition of matter useful for bonding parts to be joined comprising a cyanoacrylate adhesive and an N,N-dialkyl aniline derivative having a molecular weight of more than 200 and at most 3 carbon atoms for both N,N-dialkyl substituents together.

2. A composition as claimed in claim 1 wherein said

N,N-dialkyl aniline derivative has a molecular weight of more than 600.

3. A composition as claimed in claim 1 wherein said N,N-dialkyl aniline derivative has a molecular weight of about 700.

4. A composition as claimed in claim 1 wherein the N,N-dialkyl aniline group of said N,N-dialkyl aniline derivative is a terminal group of oligomers or polymers.

5. A composition as claimed in claim 1 wherein said N,N-dialkyl aniline derivative has the following general formula:

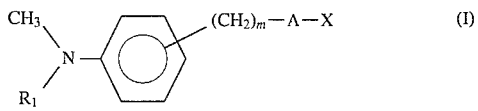

in which $R_1$ is a $CH_3$ or $C_2H_5$ group, m is the number 0, 1 or 2,

A represents O or NH or COO and

X is a polymer of ethylene or propylene oxide.

6. A composition as claimed in claim 1 wherein said N,N-dialkyl aniline derivative has the following general formula:

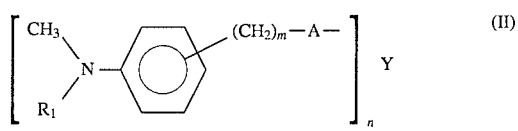

in which $R_1$, m and A are as defined in claim 3, n is a number of 1 to 6 and

Y is a group obtainable by reaction of n-functional isocyanate, epoxide, carboxylic acid or carboxylic anhydride compounds with the substituents—AH of the N,N-dialkyl aniline group.

7. A composition as claimed in claim 6 wherein the n-functional compounds contain the reaction products of polyethylene or polypropylene glycol.

8. A composition as claimed in claim 1 wherein said N,N-dialkyl aniline derivative is in the form of a 0.1 to 5% by weight solution in an organic solvent.

9. A composition as claimed in claim 1 wherein said N,N-dialkyl aniline derivative is in the form of an impregnation of porous powders.

* * * * *